(12) United States Patent
Chen et al.

(10) Patent No.: US 10,551,916 B2
(45) Date of Patent: Feb. 4, 2020

(54) DETECTING POSITIONS OF A DEVICE BASED ON MAGNETIC FIELDS GENERATED BY MAGNETIC FIELD GENERATORS AT DIFFERENT POSITIONS OF THE DEVICE

(71) Applicant: Facebook Technologies, LLC, Menlo Park, CA (US)

(72) Inventors: Ke-Yu Chen, Seattle, WA (US); Sean Jason Keller, Kirkland, WA (US); David R. Perek, Bellevue, WA (US); Tristan Thomas Trutna, Seattle, WA (US); Bruce A. Cleary, III, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 34 days.

(21) Appl. No.: 15/275,025

(22) Filed: Sep. 23, 2016

(65) Prior Publication Data

US 2017/0090568 A1 Mar. 30, 2017

Related U.S. Application Data

(60) Provisional application No. 62/232,311, filed on Sep. 24, 2015.

(51) Int. Cl.
*G06F 3/01* (2006.01)
*G01B 7/004* (2006.01)
*G06F 3/0346* (2013.01)

(52) U.S. Cl.
CPC ............. *G06F 3/014* (2013.01); *G01B 7/004* (2013.01); *G06F 3/0346* (2013.01)

(58) Field of Classification Search
CPC .......... G06F 1/163; G06F 1/1694; G06F 3/01; G06F 3/011; G06F 3/014; G06F 3/017;
(Continued)

(56) References Cited

U.S. PATENT DOCUMENTS 5,047,952 A   9/1991   Kramer et al.
6,789,043 B1 *  9/2004   Nelson ................... G01B 7/004
                                                       702/127

(Continued)

OTHER PUBLICATIONS

Ashbrook, D. et al., "Nenya: Subtle and Eyes-Free Mobile Input with a Magnetically-Tracked Finger Ring," In Proc. of CHI 2011, Session Touch 1: Tactile & Haptics, May 7-12, 2011, pp. 2043-2046.

(Continued)

*Primary Examiner* — Keith L Crawley
(74) *Attorney, Agent, or Firm* — Fenwick & West LLP

(57) ABSTRACT

A wearable device (such as a glove or other control adapted to be worn on a portion of a body) includes multiple magnetic field generators at various locations on the wearable device and a magnetic flux sensor at a predetermined position relative to the wearable device. A position determines spatial positions of locations of the wearable device based on magnetic fields generated by various magnetic field generators and detected by the magnetic flux sensor. In some embodiments, the magnetic field generators have known positions relative to each other. Additionally, each magnetic field generator may generate a magnetic field in response to an input signal having a particular attribute, allowing the magnetic flux sensor to identify magnetic fields generated by different magnetic field generators.

11 Claims, 5 Drawing Sheets

(58) Field of Classification Search
CPC ... G06F 3/0346; G01B 7/004; A41D 19/0024; A41D 19/0027
See application file for complete search history.

(56) References Cited

U.S. PATENT DOCUMENTS

| | | | | |
|---|---|---|---|---|
| 8,421,448 | B1* | 4/2013 | Tran | G01R 33/07 324/207.2 |
| 2001/0020140 | A1 | 9/2001 | Kramer | |
| 2004/0012559 | A1* | 1/2004 | Seki | G06F 3/0346 345/156 |
| 2014/0085177 | A1* | 3/2014 | Lyons | G06F 3/014 345/156 |
| 2014/0184505 | A1* | 7/2014 | Fullerton | G06F 1/169 345/158 |
| 2016/0139694 | A1* | 5/2016 | Go | G06F 3/16 345/179 |
| 2016/0246369 | A1 | 8/2016 | Osman | |
| 2016/0246370 | A1* | 8/2016 | Osman | A63F 13/428 |
| 2016/0259404 | A1* | 9/2016 | Woods | G06F 3/0346 |

OTHER PUBLICATIONS

Butler, A. et al., "SideSight: Multi-"Touch" Interaction Around Small Devices," In Proc. of UIST'08, Proceedings of the 21$^{st}$ Annual ACM Symposium on User Interface Software and Technology, Oct. 19-22, 2008, pp. 201-204.
Chan, L. et al., "Cyclops: Wearable and Single-Piece Full-Body Gesture Input Devices," In Proc. of CHI'15, ACM, Apr. 18-23, 2015, pp. 3001-3009.
Chan, L. et al., FingerPad: Private and Subtle Interaction Using Fingertips, In Proc. of UIST'13, ACM, Oct. 6-9, 2013, pp. 255-260.
Chen, K.-Y. et al., "AirLink: Sharing Files Between Multiple Devices Using In-Air Gestures," In Proc. Of UbiComp'14, ACM, Sep. 13-17, 2014, pp. 565-569.
Chen, K.-Y. et al., "uTouch: Sensing Touch Gestures on Unmodified," LCDs, In Proc. Of CHI'13, ACM, Apr. 27-May 2, 2013, pp. 2581-2584.
Chen, K.-Y. et al., "uTrack: 3D Input Using Two Magnetic Sensors," In Proc. of UISTI'13, ACM, Oct. 8-11, 2013, pp. 237-244.
Cohn, G. et al., "Humantenna: Using the Body as an Antenna for Real-Time Whole-Body Interaction," In Proc. of CHI'12, ACM, May 5-10, 2012, pp. 1901-1910.
Deyle, T. et al., "Hambone: A Bio-Acoustic Gesture Interface," in Proc. of ISW'07, IEEE, pp. 3-10.
Gupta, S. et al., "LightWave: Using Compact Fluorescent Lights as Sensors," In Proc. of UbiComp'11, ACM, Sep. 17-21, 2011, pp. 65-74.
Gupta, S. et al., "SoundWave: Using the Doppler Effect to Sense Gestures," In Proc. CHI'12, ACM, May 5-10, 2012, pp. 1911-1914.
Han, X. et al., "Wearable Handwriting Input Device Using Magnetic Field," In Proc. of SICE'07, Sep. 17-20, 2007, pp. 365-368.
Han, X. et al., "Wearable Handwriting Input Device Using Magnetic Field.: 2nd Report: Influence of Misalignment of Magnet and Writing Plane," Precision Engineering, 2010, pp. 425-430, Issue 34.

Harrison, C. et al., "Abracadabra: Wireless, High-Precision, and Unpowered Finger Input for Very Small Mmobile Devices," In Proc. of UIST'09, Proceedings of the 22$^{nd}$ Annual ACM Symposium on User Interface Software and Technology, Oct. 4-7, 2009, pp. 121-124.
Harrison, C. et al., "OmniTouch: Wearable Multitouch Interaction Everywhere," In Proc. of UIST'11, ACM, Oct. 16-19, 2011, pp. 441-450.
Harrison, C. et al., "Skinput: Appropriating the Body as an Input Surface," In Proc. of CHI'10, ACM, Apr. 10-15, 2010, pp. 453-462.
Henderson, E. N., "An Inertial Measurement System for Hand and Finger Tracking," Master Thesis, Boise State University, Dec. 2011, 217 pages.
Kim, D. et al., "Digits: Freehand 3D Interactions Anywhere Using a Wrist-Worn Gloveless Sensor," In Proc. of UIST'12, ACM, Oct. 7-10, 2012, pp. 167-176.
Kraichman, M. B, "Handbook of Electromagnetic Propagation in Conducting Media," Second Printing Edition, Naval Material Command, 1976, 122 pages.
Liang, R.-H. et al., "GaussSense: Attachable Stylus Sensing Using Magnetic: Sensor Grid," In Proc. of UIST'12, ACM, Oct. 7-10, 2012, pp. 319-326.
Pu, Q. et al., "Whole-Home Gesture Recognition Using Wireless Signals," In Proc. of MobiCom'13, ACM, Sep. 30-Oct. 4, 2013, pp. 27-38.
Raab, F. et al., "Magnetic Position and Orientation Tracking System," IEEE Transactions on Aerospace Electron System, Sep. 1979, pp. 709-718, vol. AES-15, No. 5.
Ravichandran, R. et al., "WiBreathe: Estimating Respiration Rate Using Wireless Signals in Natural Settings in the Home," IEEE PerCom'15, 2015 IEEE International Conference on Pervasive Computing and Communications (PerCom), IEEE, 2015, pp. 131-139.
Ray, P. K. et al., "A Genetic Algorithm-Based Approach to Calculate the Optimal Configuration of Ultrasonic Sensors in a 3D Position Estimation System," Robotics and Autonomous Systems, 2002, pp. 165-177, vol. 41, Issue 4.
Song, J. et al., "In-Air Gestures Around Unmodified Mobile Devices," In Proc. of UIST'I4, ACM, Oct. 5-8, 2014, pp. 319-329.
Starner, T. et al., "The Gesture Pendant: a Self-Illuminating, Wearable, Infrared Computer Vision System for Home Automation Control and Medical Monitoring," In Proc. of ISWC'00, IEEE, 2000, pp. 87-94.
Sturman, D. J. et al., "A Survey of Glovebased Input," IEEE Transactions on Computer Graphics and Applications 1994, pp. 30-39, vol. 14.
Yabukami, S. et al., "Development of a Position-Sensing System for a Wireless Magnetic Marker Using a Differential Pickup Coil," Journal of the Magnetics Society of Japan 2005, vol. 29, Issue 2, pp. 146-152. (with English abstract).
Yabukami, S. et al., "Development of a Fingertip Position-Sensing System using LC Resonated Markers," Journal of the Magnetics Society of Japan 2007, pp. 439-444, vol. 31, Issue 6.
Zhang, Q. et al., "Non-Intrusive Tongue Machine Interface," In Proc. of CHI'14, ACM, Apr. 26-May 1, 2014, pp. 2555-2558.
United States Office Action, U.S. Appl. No. 15/713,917, dated Jun. 27, 2019, 15 pages.

* cited by examiner

DETECTING POSITIONS OF A DEVICE BASED ON MAGNETIC FIELDS GENERATED BY MAGNETIC FIELD GENERATORS AT DIFFERENT POSITIONS OF THE DEVICE

CROSS REFERENCE TO RELATED APPLICATION

This application claims priority to U.S. Application No. 62/232,311, filed Sep. 24, 2015, which is incorporated by reference in its entirety.

BACKGROUND

Use of wearable devices as well as virtual reality (VR) or augmented reality (AR) devices has become more commonplace. Conventional wearable, VR, or AR devices commonly receive voice inputs, gestures, inputs from interaction with one or more of a limited number of buttons on a wearable, VR, or AR device, or inputs from interaction with a limited touch area on the a wearable, VR, or AR device. However, many of these input mechanisms are inconvenient or awkward for users to implement in various contexts.

When used in conjunction with a head mounted display device, such as those used in virtual reality systems, conventional input mechanisms have additional complications. For example, interactions by a user with a virtual reality system generally expect continuous tracking of gesture input, rather than identification of discrete gestures, to simulate interaction with objects. Accordingly, conventional virtual reality systems use computer vision techniques for tracking movements of a user's body. However, computer vision techniques are limited to identifying gestures within a field of view of an image capture device and are limited when a portion of a user's body is occluded from the field of view of the image capture device. Some virtual reality systems use inertial measurement units positioned on portions of a user's body to track gestures, but the inertial measurement units suffer from drift error that requires more frequent sensor calibration to compensate.

SUMMARY

A wearable device (such as a glove or other control adapted to be worn on a portion of a body) includes a position sensing apparatus that determines spatial positions of points on the wearable device based on magnetic fields generated by magnetic field generators and detected by an array of magnetic flux sensors. In some embodiments, the sensors of the array have known or solved positions relative to one another. In some embodiments, the wearable device comprises an array of generators being tracked by an array of sensors with known or solvable positions; alternatively, the wearable device comprises an array of sensors being tracked by an array of generators with known or solvable positions.

For example, in the case of a glove, magnetic flux density sensors (or magnetic field strength sensors) positioned about the fingertips sense the positions of the fingertips in reference to a magnetic field generator located at a predefined location on or with respect to the glove. In one or more embodiments, a magnetic field generator (such as a permanent or electro magnet) is located at a predefined (e.g., known) location on the wearable device and generates a magnetic field that is fixed in relation to the wearable device (e.g., at the wrist position in the case of a glove). Alternatively, the magnetic field generator is located separately from the wearable device, but in a predetermined or known location and generates a magnetic field that varies in a predetermined manner in relation to the wearable device. For example, the magnetic generator may be placed on a table top or on a steering wheel of a car, in the case where magnetic flux sensors are placed on a wearable glove. In such a case, each fingertip includes a magnetic flux sensor and/or a magnetic field sensor that senses flux density and/or magnetic field strength and direction of the magnetic field generated by the magnetic field generator. Using a model of the expected magnetic field (which may be calibrated upon initial use), the spatial relationship between the fingertips and the fixed magnetic field generator are determined.

In alternative embodiments, the magnetic flux sensor is fixed in relation to the wearable device (e.g., on the wrist for a wearable glove or at a known predefined location), and magnetic field generators (e.g., electromagnets) are placed on each of the fingertips. In such embodiments, each magnetic field generator includes one or more electromagnets that can be independently driven to result in the creation of a three dimensional magnetic field with known AC characteristics and geometry. Furthermore, the magnetic fields generated by each of the electromagnets can be distinguished from magnetic fields generated by other electromagnets by controlling one or more of the AC characteristics of the field. For example, each electromagnet can be driven at a different frequency (e.g., frequency division multiplexing) for disambiguation from other electromagnets. Alternatively, each electromagnet can be driven at a different instance in time (e.g., time division multiplexing) for disambiguation from (and interoperability with) other electromagnets or undesired interference in the form of ambient or external magnetic flux.

DETAILED DESCRIPTION

FIGS. 1A-1E illustrate frameworks within which spatial positions between magnetic sensors (MS) and magnetic field generators (MG) are determined, in accordance with one or more embodiments.

Figure 1B:
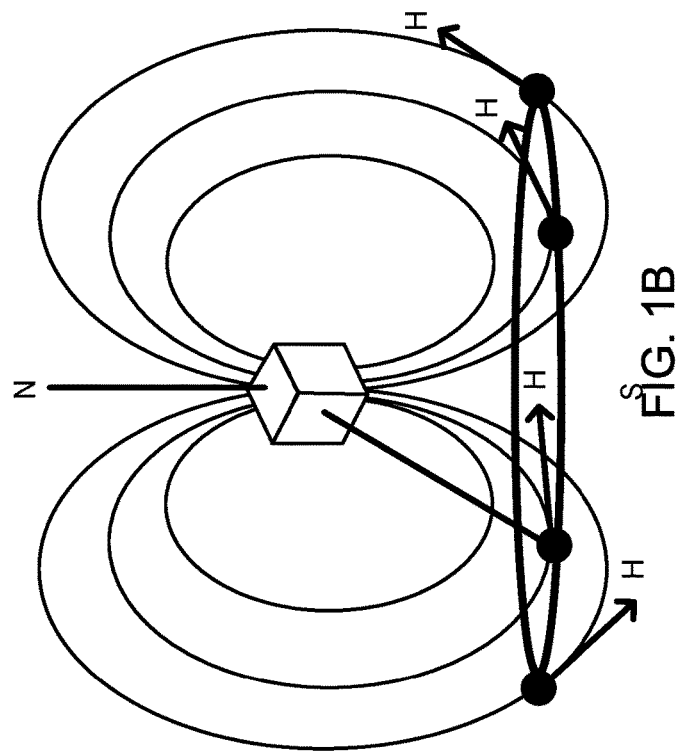
FIGS. 1A-1E illustrate frameworks within which spatial positions between magnetic flux sensors and magnetic field generators are determined, in accordance with one or more embodiments.
Figure 1A:
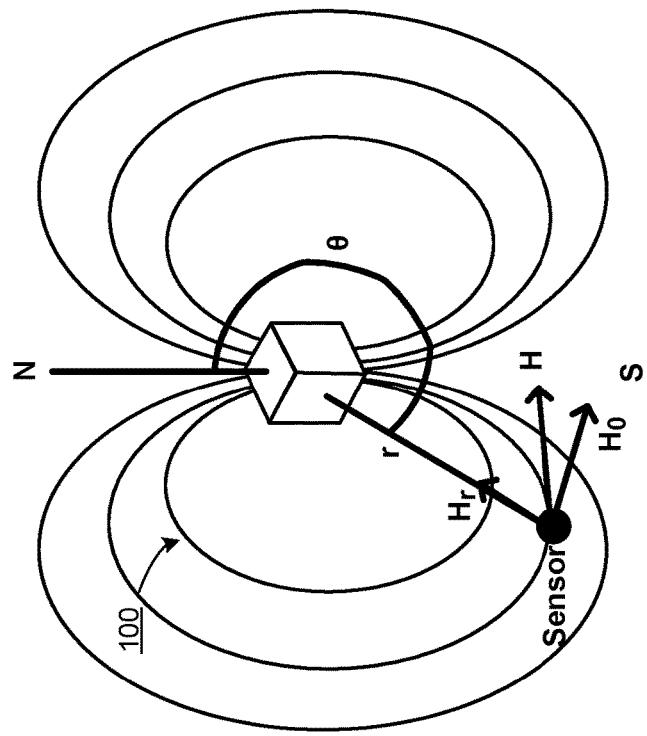

FIGS. 1A-1B illustrate a framework in a two dimensional (2D) magnetic field space for calculation of spatial relationships between magnetic generators and magnetic flux sensors.

In one or more embodiments, each magnetic field generator (MG) includes one or more magnets; each magnet of a given magnetic generator (MG) may be configured to generate a corresponding magnetic field 100 oriented along a distinct direction (e.g., a distinct coordinate axis) from other magnets of that magnetic generator. In some embodiments, a magnetic field generator (MG) comprises one or more programmable magnets (e.g., a polymagnet) that provide programmable (e.g., software-controlled) magnetic field properties. These programmable magnets enable control over and programmable variability of a number of magnetic poles, a density of magnetic poles (number of magnetic poles over a given surface area), a spatial orientation/configuration/layout of magnetic poles, magnetic field strength, a variation of magnetic field strength as a function of spatial coordinates (e.g., distance from the MG), focal points of the magnetic field, mechanical forces (e.g., attraction, repulsion, holding, alignment forces) between poles of the same polymagnet or between polymagnets, and so on.

Similarly, in one or more embodiments, each magnetic flux sensor (MS) includes one or more constituent sensing elements (e.g., one or more magnetometers). In some embodiments, each sensing element (magnetometer) is placed at a distinct known location with respect to other sensing elements within the magnetic flux sensor (MS), described in conjunction with FIG. 1C. Alternatively or additionally each sensing element (magnetometer) is configured to generate a signal responsive to a detected magnetic field that is oriented along a distinct direction (e.g., a distinct coordinate axis).

For an arbitrary location in the space, the strength of magnetic field H is proportional to two factors r (the distance between the sensing point to the magnet) and θ (the angle between the magnet's north and the sensor). In magnetism, H is usually decomposed to two orthogonal vectors (e.g., in radial space) $H_r$ and $H_\theta$. These two vectors are the basis in this 2D magnetic-field space and can be mathematically represented in terms of r and θ (as shown in FIG. 1A).

$$H_r = M \cos \theta / 2\pi r^3 \quad (1)$$

$$H_\theta = M \sin \theta / 4\pi r^3 \quad (2)$$

where M is magnetic moment. In the case of an electromagnet, the value of M related to the permeability of core material, current and area of the electromagnet. Given a constant AC current, M may be assumed to be a constant.

In one or more embodiments, to apply trilateration for spatial position estimation, the first step is to calculate the distance between the electromagnet and the sensors. Solving equations (1) and (2), the distance (r) and orientation (θ) can be calculated from the magnetic field ($H_r$ and $H_\theta$). However, there exists spatial ambiguity in the 3D space (as illustrated in FIG. 1B)—from a top view of the magnet, points located on a circle concentric with the axis of the magnet have the same field strength as they are all located at the same distance and angle from the magnet. With unknown sensor orientations, a sensor detects the same sensor measurement on these concentric positions, resulting in spatial ambiguity.

According to one or more embodiments, to resolve the spatial ambiguity, the total magnetic field strength is calculated based on equation (3):

$$\|H\|^2 = (H_r)^2 + (H_\theta)^2 = K^* r^{-6} * (3 \cos^2 \theta + 1) \quad (3)$$

where $\|H\|$ is the norm-2 of the sensor vector, r and θ are the distance between sensors and electromagnet (same as in Eq. 1 and 2), and K is a constant. The constant K is a factor of constant M (e.g., $K = M^2 / 16\pi^2$). The constant K can be leveraged to redesign the electromagnets. Equation (3) comprises the two variables r and θ to be solved for.

In other words, the physical meaning behind this framework is to convert the 3D space into a "beacon system" in which the received signal strength (i.e., $\|H\|$, the total magnetic field strength) relates to the distance from the signal source (i.e., r) and signal receiving angle (i.e., θ). The 1D projection can eliminate the need for searching unknown rotation angles of the magnet and can significantly reduce the system complexity.

Equation 3, however, is under-constrained due to the two variables (r, θ) to be solved for, from a single equation (e.g., from $\|H\|$). Hence, the next step is to remodel these two variables and convert the system into an over-constrained system.

Figure 1C:
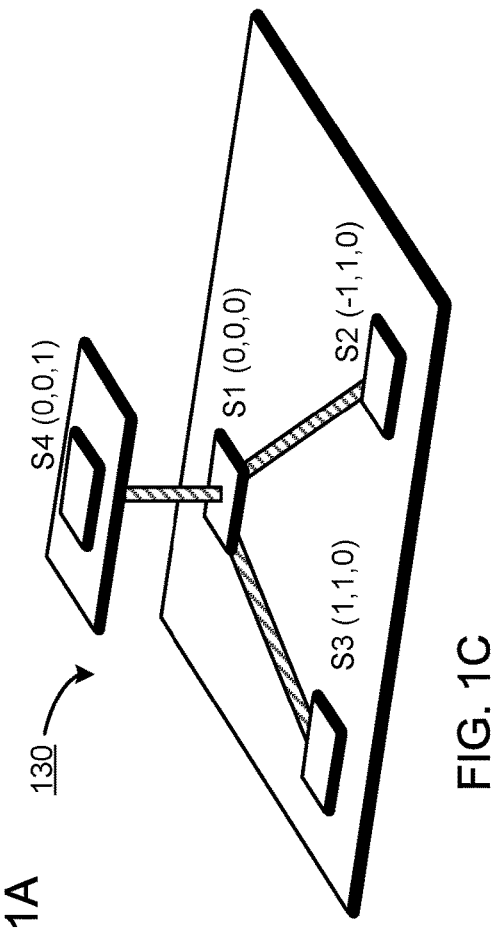

To this end, a fixed and/or known sensor layout is used to define a coordinate system (e.g., as illustrated in FIG. 1C). In one or more embodiments, and in the coordinate system 130 of FIG. 1C, sensing element (sensor) S1 is used as the origin and the coordinates of the other three sensing elements (sensors) S2, S3, S4 can be ascertained with respect to the coordinates of S1. For instance, in the illustration of FIG. 1C, sensing elements S1, S2 and S3 are coplanar while S4 is positioned above S1 along a direction orthogonal to the plane in which S1, S2 and S3 are positioned.

FIG. 1C illustrates a coordinate system 130 system for trilateration and determination of spatial positions of magnetic generators and flux sensors, according to one or more embodiments. In some embodiments, the coordinate system 130 of FIG. 1C, illustrates a single magnetic flux sensor (MS) that includes a plurality of constituent sensing elements (e.g., magnetometers S1, S2, S3, and S4). Alternatively, each magnetometer (e.g., magnetometers S1, S2, S3, and S4) of the coordinate system 130 may correspond to a distinct magnetic flux sensor (MS).

The two variables (r, θ) of equations (1)-(3) are replaced with the electromagnet's 3D position (x, y, z) in the coordinate system of FIG. 1C. In other words, given this coordinate system 130, two variables (r, θ) can be represented in terms of the electromagnet's 3D positions (x, y, z) using equations (4) and (5):

$$r_1 = (x^2 + y^2 + z^2)^{1/2} \quad (4)$$

$$\cos \theta_1 = z / r_1 \quad (5)$$

Similarly, these three shared variables (x, y, z) can be substituted into the equation (3) for the other three sensors, resulting in equations (6)-(11):

$$r_2 ((x+1)_2 + (y-1)^2 + z^2)^{1/2} \quad (6)$$

$$\cos \theta_2 = z / r_2 \quad (7)$$

$$r_3 = ((x-1)^2 + (y-1)^2 + z^2)^{1/2} \quad (8)$$

$$\cos \theta_3 = z / r_3 \quad (9)$$

$$r_4 = (x^2 y^2 + (z-1)^2)^{1/2} \quad (10)$$

$$\cos \theta_4 = z / r_4 \quad (11)$$

The resulting system of equations is over-constrained and has four equations (of Eq. 3) from each of four sensors to be solved for three shared variables (x, y, z). In some embodiments, where the magnetic field generator (MG) comprises a programmable magnet (e.g., a polymagnet), magnetic field properties of the MG are programmable, controllable, and/or reconfigurable. In some embodiments, the programmable, controllable, and/or reconfigurable magnetic field properties include a number of magnetic poles, a density of magnetic poles (e.g., number and distribution of magnetic poles over a given surface area of the MG), a spatial orientation/ configuration/layout of magnetic poles, magnetic field strength, a variation of magnetic field strength as a function of spatial coordinates (e.g., distance from the MG), focal points of the magnetic field, mechanical forces (e.g., attraction, repulsion, holding, alignment forces) between poles of the same polymagnet or between polymagnets, and so on. For example, a spatial flux density or flux orientation mapping can be programmed or configured (e.g., to be distinct from the spatial flux density relationship described in equations (1) and (2)) to uniquely or distinctly encode position and/or orientation of different magnets and/or different sensors. In some embodiments, polymagnets and programmable magnetic sensors could be programmed to provide stronger magnetic fields, or fields concentrated within shorter ranges to improve resolution and accuracy of position sensing within the shorter sensing ranges.

In some embodiments, when the magnetic field generator (MG) is a programmable magnet or an electromagnet, the signals applied to the magnetic field generator to generate the magnetic field (e.g., frequency or time division multiplexed signals) are optionally pre-processed or normalized by a function of or corresponding to $1/r^3$ corresponding to the effect of spatial distance on the magnetic field components in radial coordinate space. For example, a "non-affine" transformation may be applied to the signals applied to the magnetic field generator to transform the input signals based on a normalization function corresponding to $1/(r^3)$ in radial coordinate (r, θ) space.

Figure 1E:
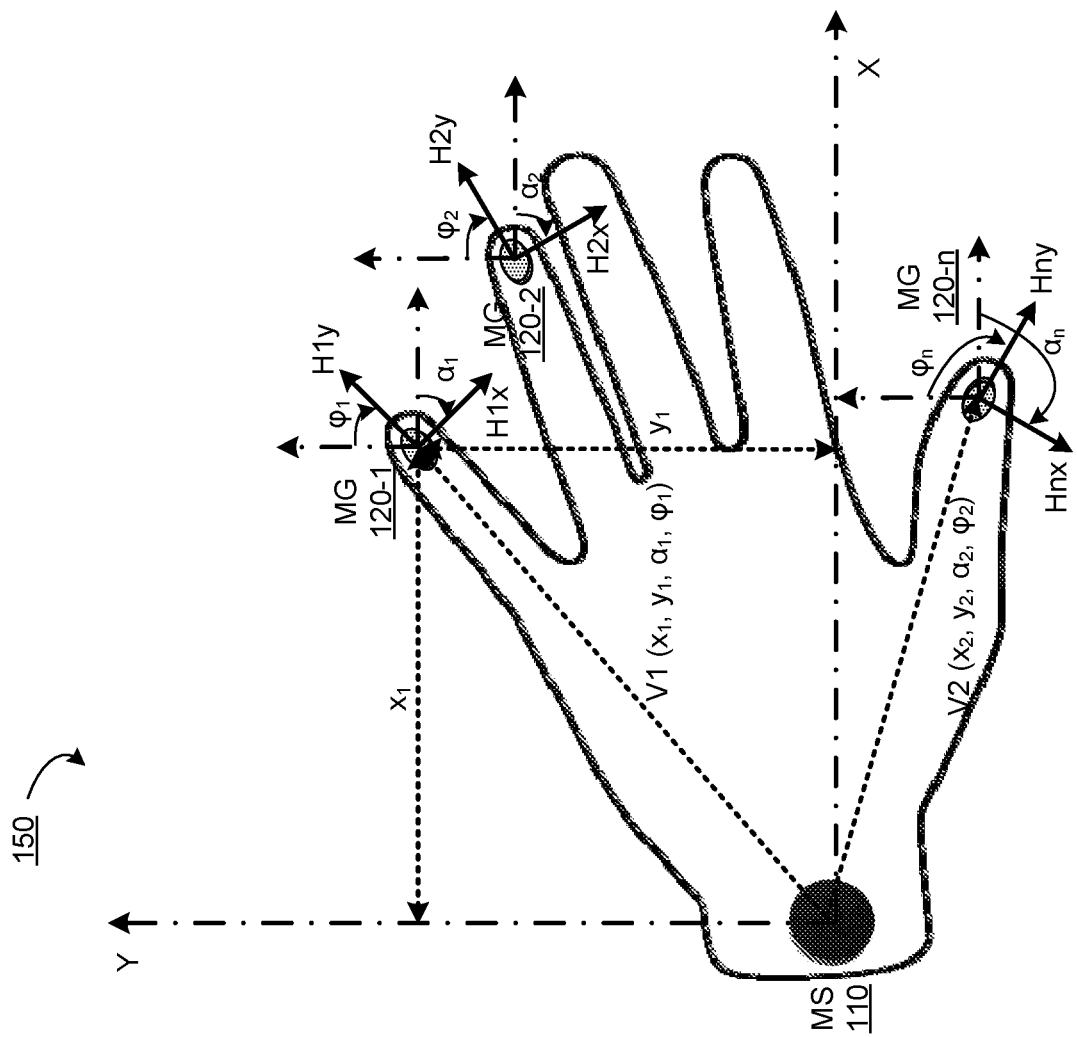
Figure 1D:
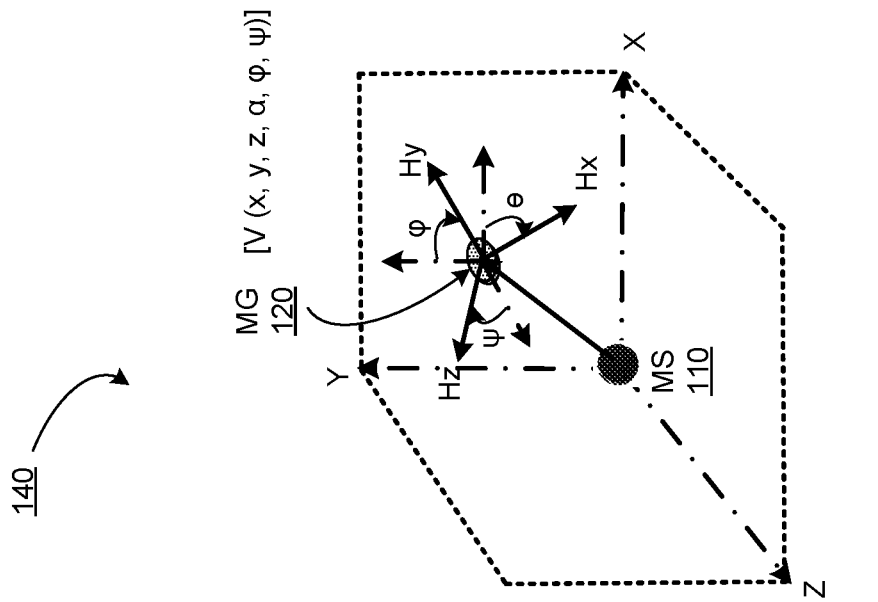

FIG. 1D illustrates an alternative 3-dimensional framework 140 for determining spatial position vectors in 3D Cartesian space for a configuration with a single magnetic flux sensor (MS) 110 and single magnetic generator (MG) 120.

In some embodiments, a spatial position is expressed as a vector with multiple components representing spatial coordinates (positions and/or orientations) in a multi-dimensional space. For example, in a three dimensional (3D) coordinate system, the vector components of a spatial position vector include Cartesian distances along three orthogonal Cartesian coordinate axes (X, Y, Z) and/or angular orientation (angles α, φ, ψ) defined with respect to three mutually perpendicular Cartesian axes (X, Y, Z) or mutually perpendicular Cartesian planes (YZ, XZ, and XY). In some embodiments, the spatial position vectors may include Cartesian distances along three orthogonal Cartesian coordinate axes (X, Y, Z), but not the angular orientations (angles α, φ, ψ).

In one or more embodiments, each magnetic field generator (MG) 120 includes one or more magnets; each magnet of a given magnetic generator (MG) 120 may be configured to generate a corresponding magnetic field oriented along a distinct direction (e.g., a distinct coordinate axis) from other magnets of that magnetic field generator 120. In some embodiments, a magnetic field generator 120 includes three magnets, the three magnets generating three orthogonal magnetic fields along three orthogonal Cartesian coordinate axes (Hx, Hy, and Hz, as illustrated for MG 120 in FIG. 1D).

Similarly, each magnetic flux sensor (MS) 110 includes one or more constituent sensing elements (e.g., one or more magnetometers), each sensing element (magnetometer) configured to generate a signal responsive to a detected magnetic field that is oriented along a distinct direction (e.g., a distinct coordinate axis). For example, a magnetic flux sensor (e.g., MS 110 of FIG. 1D) includes three sensing elements (such as hall-effect sensors) configured to generate (output) corresponding signals (e.g., current outputs) that are proportional to and responsive to magnetic fields along the three different orthogonal axes (X, Y, and Z) of a three dimensional spatial coordinate system.

In such embodiments, a spatial position vector (e.g., vector V, as illustrated in FIG. 1D) may be defined for each pairing of magnetic field generator 120 and magnetic flux sensor 110 to represent Cartesian distances along three orthogonal Cartesian coordinate axes (X, Y, Z) between the magnetic field generator 120 and the magnetic flux sensor 110 included in the pairing. The spatial position vector may also include angular orientations represented as angles (α, φ, ψ) between the magnetic field axes of the MG 120 (e.g., Hx, Hy, and Hz) and the sensing axes of the MS 110 (e.g., X, Y, and Z). The angles may alternatively be computed with respect to the three mutually perpendicular Cartesian planes (YZ, XZ, and XY) that are defined either for the MS 110 or the MG 120.

FIG. 1E illustrates a 2-dimensional framework 150 for determining spatial position vectors in 2D Cartesian space for a configuration with a single magnetic flux sensor (MS) 110 and multiple magnetic generators (MGs) 120-1, 120-2, and 120-n.

In some embodiments, the magnetic fields (H1x, H1y; H2x, H2y; Hnx, Hny) from the different magnetic generators 120-1, 120-2, 120-n are distinguishable from each other, allowing the magnetic flux sensor 110 to be able identify magnetic fields from different magnetic generators MG 120-1, 120-2, 120-n, allowing separate determination of positions of different magnetic generators MG 120-1, 120-2, 120-n.

As illustrated in FIG. 1D for the first magnetic field generator MG 120-1 with reference to the magnetic flux sensor MS 110, a spatial position vector (V1) including the Cartesian distances ($x_1$, $y_1$) and angular orientations ($α_1$, $φ_1$), can be computed based on the signals detected by the MS 110 responsive to the magnetic fields (H1x and H2x) generated by MG 120-1.

Similarly, as illustrated in FIG. 1E, a spatial position vector (V) including the Cartesian distances (x, y, z) and angular orientations (α, φ, ψ), can be computed based on the signals detected by a MS 110 responsive to the magnetic fields (Hx, Hy, and Hz) generated by a MG 120-1, 120-2, 120-n in a 3D Cartesian space.

In some embodiments, in a 3D coordinate system, the spatial ambiguity in positions in the 3D sensor space (explained above in conjunction with FIGS. 1A-1B) is resolved by performing 2D projections from the 3D space to a 2D magnetic field space. This 2D projection involves three unknown rotation angles and can be mathematically indicated as below:

$$T_{R,P,Y}H = T_{R,P,Y}\begin{pmatrix} H_x \\ H_y \\ H_z \end{pmatrix} = \begin{pmatrix} H_r \\ H_0 \\ 0 \end{pmatrix} = \begin{pmatrix} M\cos\theta/2\pi r^3 \\ M\sin\theta/4\pi r^3 \\ 0 \end{pmatrix} \quad (12)$$

where H is a sensor vector and $T_{R,P,Y}$ is a rotation matrix with three unknown variables R (Raw), P (Pitch) and Y (Yaw) corresponding to angular orientations (α, φ, ψ), to project the 3D sensor space to the 2D magnetic-field space. As equation (12) is an under-constrained system, there are three equations ($H_x$, $H_y$, $H_z$) for determining five unknown variables (R, P, Y, r, θ). In some embodiments a searching process that determines a global optimal solution is used to solve for the unknown variables (e.g., R, P, Y).

Figure 2:
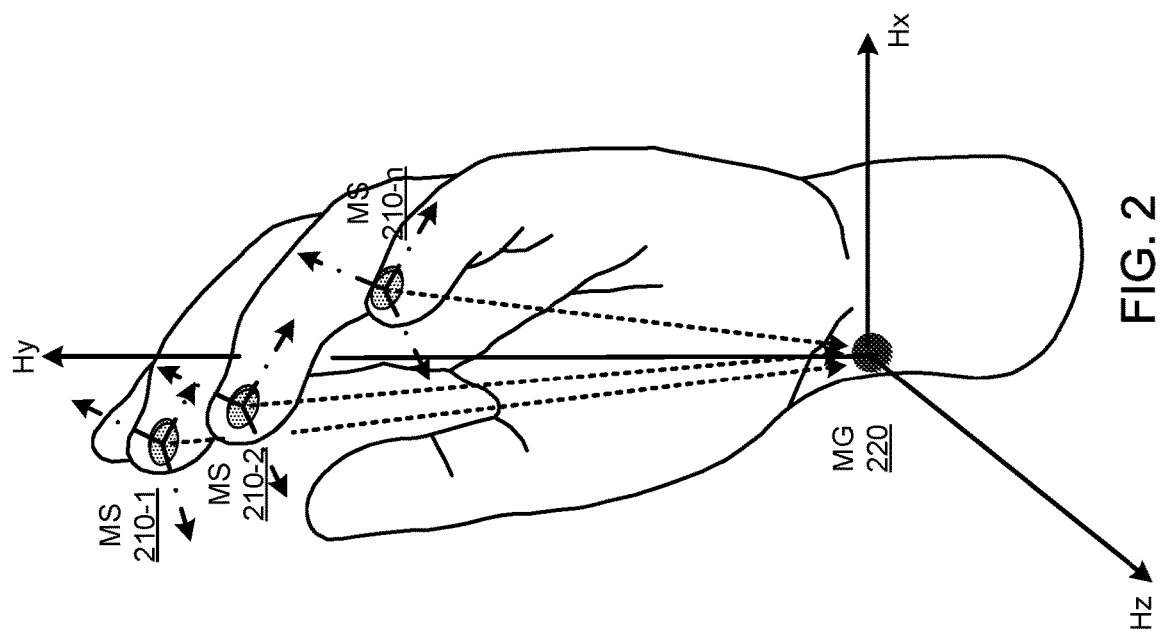
FIG. 2 illustrates positions of magnetic sensors and magnetic field generators in relation to a hand, where a plurality of magnetic sensors positioned at different fingers coupled to a common magnetic field generator, in accordance with one or more embodiments.

Common Reference Magnetic Field Generator and Different Magnetic Sensors on Different Fingers FIG. 2 illustrates positions of multiple magnetic flux sensors (MS) 210-1, 210-2, 210-n and a magnetic field generator (MG) 220. In the embodiment shown in FIG. 2, a plurality of magnetic flux sensors 210-1, 210-2, 210-n are shown in relation to a hand, where different magnetic flux sensors 210-1, 210-2, 210-n are located at various fingers of the hand are coupled to a common magnetic field generator 220 located at or near the wrist of the hand The magnetic flux sensors 210-1, 210-2, 210-n and magnetic field generator 220 may be coupled to or provided within a wearable glove to be worn around the hand.

As illustrated in FIG. 2, one or more magnetic flux sensors (MS) 210-1, 210-2, 210-n are positioned on one or more fingertips, and a common magnetic generator MG 220 is positioned at a predefined location (e.g., at the wrist). In some embodiments, and as explained with reference to FIGS. 1A-1E, each of the magnetic flux sensors 210-1, 210-2, 210-n may include one or more sensing elements. For example, each magnetic flux sensor 210-1, 210-2, 210-n includes a plurality of sensing elements having predefined, known, or solvable positions relative to each other, as further described above with reference to sensing elements S1, S2, S3, and S4 of the coordinate system 130 of FIG. 1C. Alternatively, each magnetic flux sensor 210-1, 210-2, 210-n corresponds to a sensing element (e.g., magnetometers S1, S2, S3, and S4 of the coordinate system 130 of FIG. 1C) having a solvable or known spatial location relative to other magnetic flux sensors 210-1, 210-2, 210-n.

In some embodiments, the magnetic generator (MG) 220 includes a single permanent magnet or electromagnet. In alternative embodiments, the magnetic generator (MG) 220 includes a plurality of permanent magnets having distinct (e.g., and known or solvable) relative spatial positions and/or different (e.g., and known or solvable) relative orientations. In alternative embodiments, the magnetic generator (MG) 220 includes one or more programmable magnets (e.g., polymagnets) with programmable, controllable, and/or reconfigurable magnetic properties.

Each magnetic flux sensor 210-1, 210-2, 210-n outputs a signal (or combination of signals) responsive to the magnetic fields (Hx, Hy, Hz; or $H_r$ and $H_\theta$) generated by the MG 220, and detected at the respective magnetic flux sensor 210-1, 210-2, 210-n. The magnetic fields for the magnetic field generator 220 may be expressed as vector components ($H_r$ and $H_\theta$), as further described above with reference to FIGS. 1A-1B. As further described above in conjunction with FIGS. 1A-1E, spatial position vectors V1, V2, and Vn are computed that correspond to each magnetic flux sensor 210-1, 210-2, 210-n (e.g., V1 corresponds to magnetic flux sensor 210-1, V2 corresponds to magnetic flux sensor 210-2, and Vn corresponds to magnetic flux sensor 210-n) based on signals output from the respective magnetic flux sensor 210-1, 210-2, 210-n.

The spatial vectors V1, V2, Vn, represent positions of the magnetic generator (MG) 220 with respect to each of the magnetic flux sensors 210-1, 210-2, 210-n. From the spatial vectors V1, V2, Vn, positions of the magnetic flux sensors 210-1, 210-2, 210-n (and the corresponding fingertips) relative to the common the magnetic field generator 220 are determined.

In some embodiments, a model of an expected magnetic field is calibrated upon initial use for various positions of the magnetic flux sensors 210-1, 210-2, 210-n with respect to the location of the magnetic field generator 220 (with the positions of the magnetic flux sensors 210-1, 210-2, 210-n acting a proxies for the positions of various fingertips). Using the calibrated model, the spatial relationships between the magnetic flux sensors 210-1, 210-2, 210-n and the fixed magnetic field generator 220 are determined at run-time.

Figure 3:
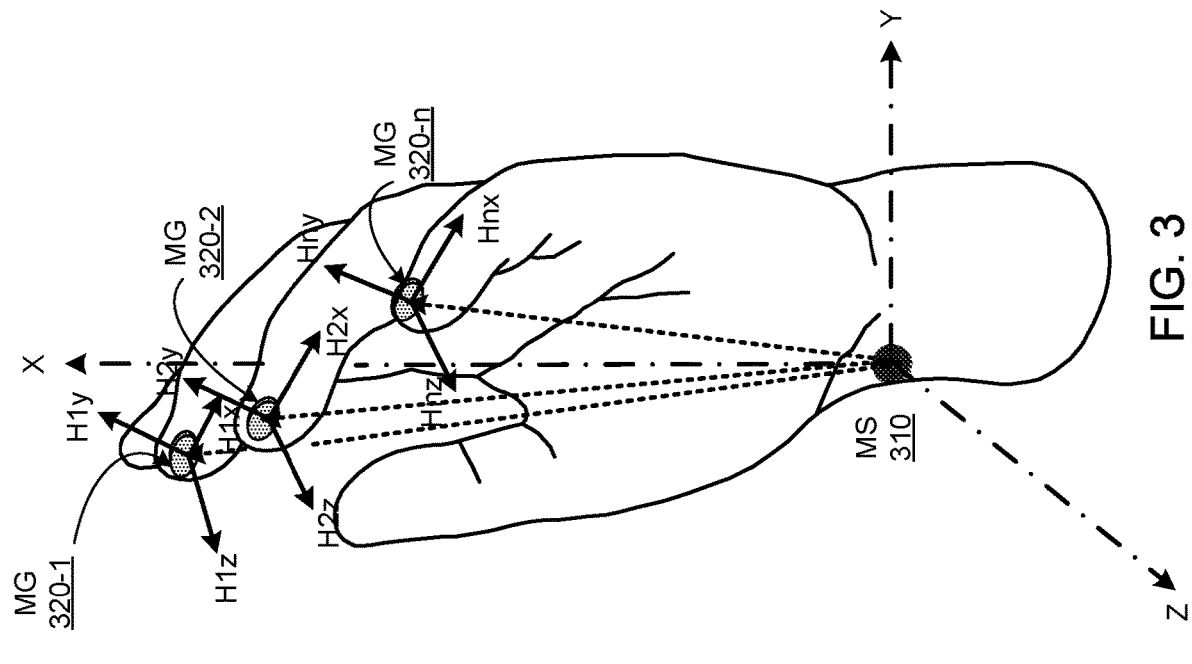
FIG. 3 illustrates positions of magnetic flux sensors and magnetic field generators in relation to a hand, where a plurality of magnetic field generators positioned at different fingers are coupled to a common magnetic flux sensor, in accordance with one or more embodiments.

Common Magnetic Flux Sensor and Different Magnetic Field Generators on Different Fingers FIG. 3 illustrates positions of a magnetic flux sensor (MS) 310 and multiple magnetic field generators (MG) 320-1, 320-2, 320-n in relation to a hand. In the example of FIG. 3, a plurality of magnetic field generators 320-2, MG 320-n are positioned on different fingers of the hand and are coupled to a common magnetic flux sensor 310 located at or near the wrist of the hand. The magnetic flux sensor 310 and magnetic field generators 320-1, 320-2, 320-n illustrated in FIG. 3 may be coupled to or provided within a wearable glove to be worn around the hand.

In some embodiments, and as further described above in conjunction with FIGS. 1A-1E, the magnetic flux sensor 310 may include one or more sensing elements. For example, magnetic flux sensor 310 includes a plurality of sensing elements having predefined, known, or solvable relative positions, as further described above with reference to sensing elements S1, S2, S3, and S4 of the coordinate system 130 of FIG. 1C.

In some embodiments, each of the magnetic generators 320-1, 320-2, 320-n includes a single permanent magnet or electromagnet. In alternative embodiments, a single magnetic generator 320-1, 320-2, 320-n includes a plurality of permanent magnets having distinct (e.g., and known or solvable) relative spatial positions and/or different (e.g., and known or solvable) relative orientations. In alternative embodiments, a single magnetic generator 320-1, 320-2, 320-n includes one or more programmable magnets (e.g., polymagnets) with programmable, controllable, and/or reconfigurable magnetic properties.

As illustrated in FIG. 3, the common magnetic flux sensor 310 is positioned at a predefined location. For example, the magnetic flux sensor 310 is positioned on a wrist of the hand or at another predefined location. In the example of FIG. 3, each magnetic field generator 320-1, 320-2, 320-n, are placed on different fingertips of the hand.

In some embodiments, each magnetic field generator 320-1, 320-2, 320-n includes one or more electromagnets that can be independently actuated based on current provided through a current carrying coil to generate orthogonal magnetic fields (H1x, H1y, H1z; H2x, H2y, H2z; and so on). The magnetic fields for each of the magnetic field generators MG 320-1, 320-2, 320-n can be expressed as vector components ($H_r$ and $H_\theta$) as further described above in conjunction with FIGS. 1A-1B.

Furthermore, in embodiments where the magnetic field generators 320-1, 320-2, 320-n are electromagnets, the magnetic fields generated by each of electromagnet may be distinguished from magnetic fields generated by other electromagnets by controlling one or more attributes (e.g., frequency, timing, modulation codes/patterns) of the stimulating current provided to various electromagnets. For example, each electromagnet is stimulated at a different frequency for disambiguation (based on frequency division multiplexing) from other electromagnets. Accordingly, signals detected by the magnetic flux sensor 310 are capable of being uniquely associated with a particular electromagnet based on a frequency of the signals. Alternatively, each electromagnet can be stimulated at a different time for disambiguation (e.g., time division multiplexing) from other electromagnets. Accordingly, signals detected by the magnetic flux sensor 310 can be uniquely associated with a particular electromagnet based on a time interval when the magnetic flux sensor 310 detected the signals.

In the example of FIG. 3, one or more magnetic field generators 320-1, 320-2, 320-n are positioned on one or more fingertips of a hand and a common magnetic flux sensor 310 is positioned at a predefined location (e.g., at the wrist). The magnetic flux sensor 310 outputs a signal (or combination of signals) responsive to magnetic fields generated by each magnetic field generator 320-1, 320-2, 320— that are detected by the magnetic sensor 310. Spatial position vectors V1, V2, and Vn are computed, as described with reference to FIG. 1A-1B above, from the signal output by the magnetic flux sensor 310, in response to a magnetic field detected from various magnetic field generators 320-1, 320-2, 320-n. For example, spatial position vector V1 corresponds to an output from the magnetic flux sensor 310 based on a magnetic field detected from magnetic field generator 320-1; similarly, spatial position vectors V2 and Vn correspond to outputs from the magnetic flux sensor 310 based on a magnetic field detected from magnetic field generator 320-2 and from magnetic field generator 320-n, respectively. The spatial vectors V1, V2, and Vn, are used to determine the positions of the magnetic field generators 320-1, 320-2, 320-n, which act as a proxy for the positions of different fingertips, in reference to the location of the magnetic flux sensor 310.

Figure 4:
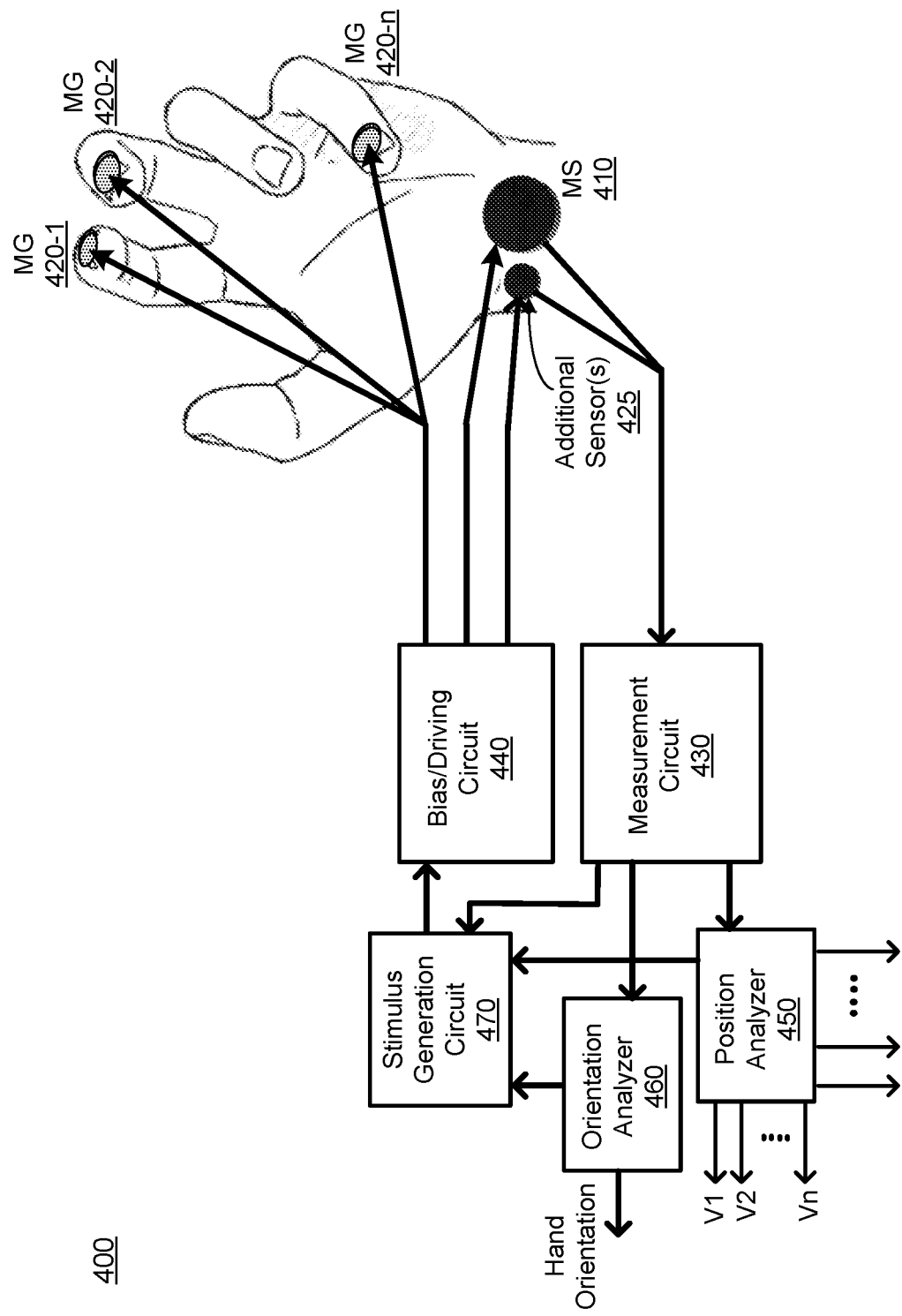
FIG. 4 illustrates a system for position and location sensing of magnetic generators relative to a magnetic flux sensor, in accordance with one or more embodiments.

FIG. 4 illustrates one embodiment of a system 400 for position and location sensing of magnetic generators (MG) 420-1, 420-2, 420-n relative to a magnetic flux sensor (MS) 410. In various embodiments, the system 400 may include different or additional components than those described in conjunction with FIG. 4. Additionally, functionality provided by different components described below in conjunction with FIG. 4 may be differently allocated among various components of the system 400 in some embodiments.

In the example shown in FIG. 4, the system 400 includes the magnetic flux sensor 410 and one or more additional sensors 425. Additionally, the system 400 includes one or more magnetic field generators 420-1, 420-2, 420-n, as further described above in conjunction with FIGS. 2 and 3. The additional sensors 425 may include inertial sensors such as accelerometers and gyroscopes. The system 400 also includes a bias/driving circuit 440 for providing bias signals (such as power and other operating signals) and driving signals (such as stimulating/driving currents and voltages) to the magnetic flux sensor 410, to the one or more additional sensors 425, and to the magnetic field generators 420-1, 420-2, 420-n. The driving signals provided to each of the magnetic field generators 420-1, 420-2, 420-n may be disambiguated from the corresponding driving signals provided to other magnetic field generators 420-1, 420-2, 420-n based on attributes such as frequency, timing, modulation codes, modulation patterns, and so on. The measurement circuit 430 detects and selects signals from the magnetic flux sensor 410 and the one or more additional sensors 425 and optionally preconditions (e.g., filters, amplifies, denoises) the detected signals. The magnetic flux sensor 410 may have a sensing element that is resonant to certain frequencies and may be tuned to respond to those frequencies, allowing the magnetic flux sensor 410 to detect magnetic fields generated by different magnetic field generators 420-1, 420-2, 420-n that operate on different frequencies. For example, the measurement circuit 430 includes bandpass filters that are each centered at different frequencies to extract and differentiate the magnetic fields detected from different individual magnetic field generators 420-1, 420-3, 420-n. In one implementation, the bandpass filters are 6th-order finite impulse response (FIR) filters with a 3 dB cutoff at +2 and −2 Hz from a center frequency. If a data rate of the system 400 is 320 samples/second, the usable bandwidth is about 160 Hz, so different magnetic field generators 420-1, 420-2, 420-n may be operated at 70 Hz, 85 Hz, 100 Hz, 115 Hz and 125 Hz in one embodiment.

The measurement circuit 430 may include an analog demodulator and selection filter which serves to convert the detected signal to a baseband (frequency range having signal content of interest). Additionally, the measurement circuit 430 may include a digital signal processor to digitally filter the detected or baseband-converted signal to further select frequency components of interest. The position analyzer 450 receives output from the measurement circuit 430 and generates spatial position vectors (V1, V2, Vn, and the like), corresponding to each pair of a magnetic field generator 420-1, 420-2, 420-n and the magnetic flux sensor 410. A spatial position vector corresponding to a pair of a magnetic field generator 420-1 and the magnetic flux sensor 410 represents a position of the magnetic field generator 420-1 relative to the magnetic flux sensor 410. The orientation analyzer 460 determines an orientation of a hand of a user proximate to, or contacting, the magnetic field generators 420-1, 420-2, 420-n, based on the signals captured by the one or more additional sensors 425 (e.g., inertial sensors, such as accelerometers and gyroscopes optical sensors or imaging sensors such as cameras). In some embodiments, the axes of the one or more additional sensors 425 are aligned to the measurement axes of the magnetic flux sensors 420-1, 420-2, 420-n to enable direct use or application of angular orientations measured with reference to the magnetic field axes of magnetic fields generated by the magnetic field generators 420-1, 420-2, 420-n. In such embodiments, by augmenting each magnetic generator 420-1, 420-2, 420-n with an additional sensor 425 (e.g., an inertial measurement unit comprising an accelerometer and gyroscope) and calculating the orientation of the magnetic generator 420-1, 420-2, 420-n relative to a known frame of reference (e.g., a point relative to the inertial measurement unit or a point within the internal measurement), 6 degrees of freedom (DOF) of the magnetic field generators 420-1, 420-2, 420-n (3 DOFs from the accelerometer and 3 DOFs from the gyroscope) may be determined.

In one or more embodiments, system 400 also includes a stimulus generation circuit 470 configured to generate signals that modify biasing and driving properties of the magnetic flux sensor 410, the one or more additional sensors 425, and the one or more magnetic field generators 420-1, 420-2 420-n based on the measured or detected signals. The stimulus generation circuit 470 may receive signals from the position analyzer 450 and from the orientation analyzer 450, or from the measurement circuit 430, and modify one or more properties of the magnetic fields generated by the magnetic field generators 420-1, 420-2, 420-n based on the received signals.

The spatial positions and the hand orientation may be combined to determined locations of fingertips or other portions of the hand. In some embodiments, a location of a fingertip corresponds to absolute coordinates in a three dimensional (3D) space given a fixed reference system such as a geo-positioning system defined relative to the Earth (e.g., in terms of longitude/latitude). In such embodiments, a location corresponds to coordinates defined relative to a referenced coordinate system (e.g., such as the coordinate system 130 of FIG. 1C where an electromagnet's position is computed relative to the known sensors).

Figure 5:
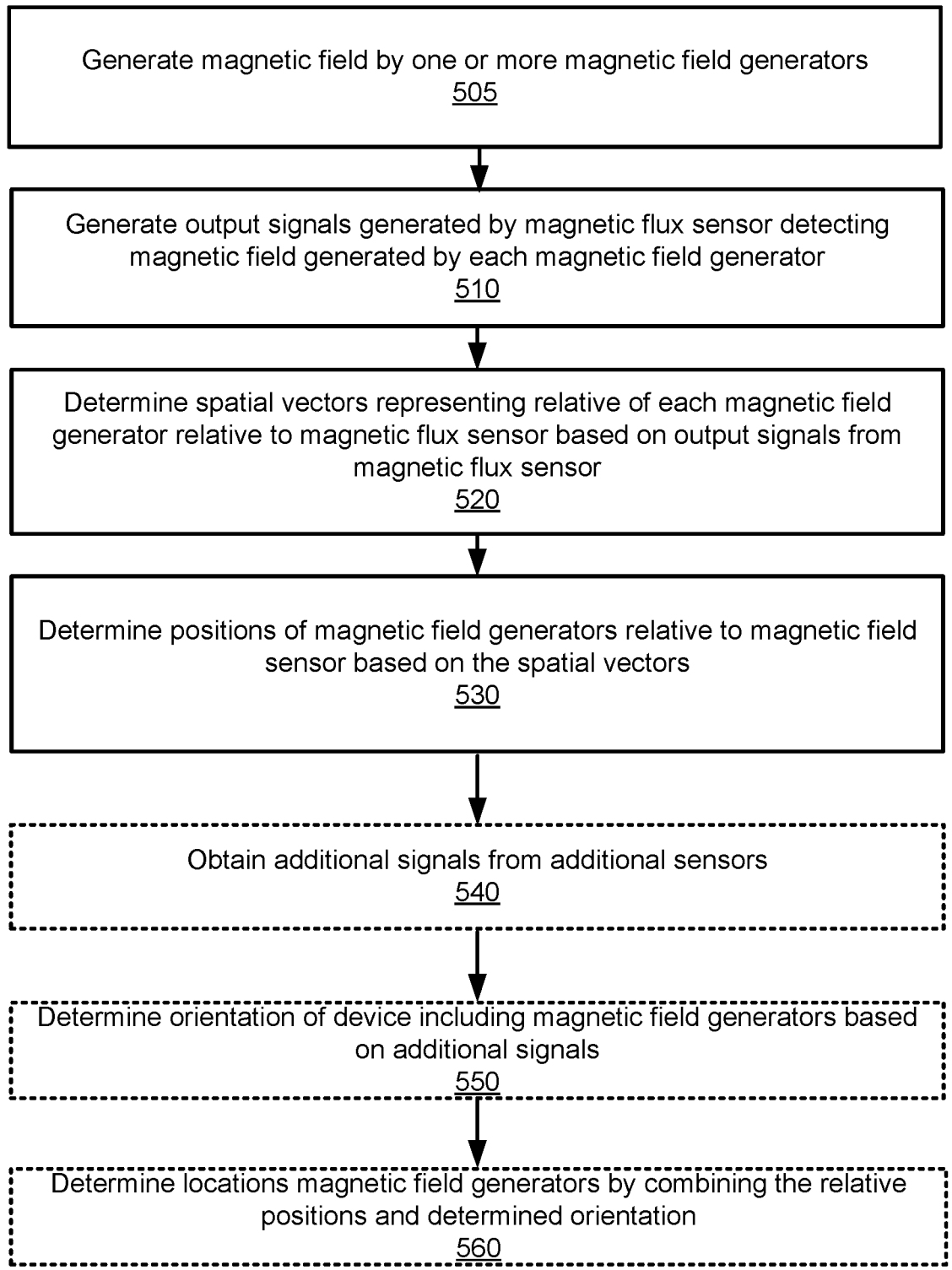
FIG. 5 illustrates a flowchart of a method for determining positions of magnetic field generators coupled to portions of a device relative to a magnetic flux sensor, according to one or more embodiments.

FIG. 5 is a flowchart of one embodiment of a method for determining positions of magnetic field generators coupled to portions of a device relative to a magnetic flux sensor. In various embodiments, the method may include different or additional steps than those described below in conjunction with FIG. 5. Additionally, in some embodiments, steps of the method may be performed in different orders than the order described in conjunction with FIG. 5.

One or more magnetic fields are generated 505 by one or more magnetic field generators, such as those described above in conjunction with FIGS. 2 and 3, positioned on a wearable device. One or more magnetic flux sensors, such as those further described above in conjunction with FIGS. 2 and 3, are positioned at predetermined positions relative to the wearable device. For example, a magnetic flux sensor is positioned at a predetermined position on the wearable device. Alternatively, a magnetic flux sensor is positioned at a predetermined position external to the wearable device. Responsive to the generated magnetic fields, a magnetic flux sensor generates 510 one or more output signals. An output signal generated 510 by the magnetic flux sensor is based on a strength and a direction of a magnetic field generated 505 by one or more magnetic field detected by the magnetic flux sensor. As described above in conjunction with FIGS. 3 and 4, an output signal may generated 510 by the magnetic flux sensor based on a direction and an orientation of a magnetic field generated by a particular magnetic field generator, so different output signals are generated 510 based on directions and orientations of magnetic fields generated by different magnetic field generators and detected by the magnetic flux sensor.

Based on the output signals from the magnetic flux sensor, spatial vectors representing relative positioning for each pairing of the magnetic flux sensor and a magnetic field generator are determined 520. For example, the position analyzer described above in conjunction with FIG. 4 receives output signals from the magnetic flux sensor and determines 520 spatial vectors representing relative positions of each magnetic field generator relative to the magnetic flux sensor. Relative positions for portions of the wearable device corresponding to positions of the magnetic field generators (e.g., fingertip positions of a wearable glove) are determined based on the spatial vectors.

In some embodiments, and as described with reference to FIGS. 1A-1C, the spatial localization algorithm comprises:

(1) Sensing or measuring (and optionally storing) the magnetic vector H from one or more magnetic flux sensors for one or more of the magnetic generators.

(2) For each axis in H (i.e., for each component of the magnetic field vector H such as Hx, Hy, Hz; or $H_r$ and $H_\theta$), applying a bandpass filter to extract magnetic fields emitted from individual electromagnets and, optionally, extracting envelopes of filtered data using the Hilbert transform.

(3) Calculating the total magnetic field strength (e.g., as the norm-2 of H (using eq. (3)).

(4) Performing a coordinate transform to a Cartesian coordinate space (e.g., to express the components of the magnetic field vector H as functions of 3D Cartesian variables (x, y, z)) to obtain a new set of equations expressing the measured components of the magnetic field vector H in terms of (as functions of) the 3D Cartesian variables. In some embodiments, performing the coordinate transform comprises substituting variables of a radial coordinate system (e.g., the two variables r and θ in Eq. 3) with 3D Cartesian coordinate system variables (x, y, z). In some embodiments, the coordinate transform is performed using Eqs. 4 to 11.

(5) Computing a magnetic field generator's 3D position in terms of the 3D Cartesian coordinate system variables (x, y, z) by solving the new set of equations expressing the measured components of the magnetic field vector H in terms of (as functions of) the 3D Cartesian variables.

In one or more embodiments, additional signals from one or more additional sensors, such as those described above in conjunction with FIG. 4, are obtained 540. For example, one or more additional sensors are inertial sensors (such as accelerometers and gyroscopes). An orientation of the wearable device (e.g., of a hand wearing the glove) is determined 550 using the additional signals in various embodiments. Locations of portions of the wearable device (e.g., locations of the fingers on a glove) are determined 560 by combining the position vectors and the orientation information.

In one or more embodiments, the disclosed systems and methods for position sensing (e.g., sensing of fingertip positions) are used in conjunction with a virtual reality (VR) system. For example, the disclosed methods for detecting positions of fingers or other body parts are used to provide information about or to render a state of a body part (e.g., a hand) of a user contacting portions of the wearable device in a VR environment that one or more portions of or VR world. For example, states of a hand (e.g., open, closed, pointing, gesturing, etc.) contacting the wearable device are be determined based on the detected positions or locations of fingers or finger tips of the hand.

The figures depict various embodiments of the present invention for purposes of illustration only. One skilled in the art will readily recognize from the following discussion that alternative embodiments of the structures and methods illustrated herein may be employed without departing from the principles of the invention described herein.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A device comprising:
    a plurality of magnets positioned at particular locations on the device, the particular locations on different fingers of a user of the device, each magnet configured to generate a magnetic field, the plurality of magnets comprising a plurality of electromagnets, each electromagnet receiving an input signal having a different frequency and generating the magnetic field in response to receiving the input signal;
    one or more inertial measurement units (IMUs), each IMU generating a signal for an angular orientation of a particular magnet of the plurality of magnets, the particular magnet located on a finger of the user;
    a magnetic flux sensor located at a predetermined positioned relative to the device and configured to detect a strength and a direction of the magnetic field generated by each magnet and configured to generate an output signal based on the detected strength and the detected direction of the magnetic field of each of the plurality of magnets, the magnetic flux sensor further including a plurality of filters, with different filters centered on different frequencies of input signals received by different electromagnets; and
    a position analyzer coupled to the magnetic flux sensor, the position analyzer configured to determine spatial vectors representing a position of each magnet relative to the magnetic field sensor, the position of the magnet relative to the magnetic field sensor based on the output signal generated by the magnetic flux sensor, and configured to determine further positional information for at least some of the plurality of magnets located on the fingers of the user based on the signal generated by the one or more IMUs.

2. The device of claim 1, wherein, each filter of the plurality of filters has an output based on the detected strength and the detected direction of the magnetic field of a particular electromagnet receiving the input signal having the frequency.

3. The device of claim 2, wherein the position analyzer is further configured to: determine spatial vectors representing a position of the electromagnet magnet relative to the magnetic field sensor based on the output from a filter centered on the frequency of the input signal received by the electromagnet.

4. The device of claim 1, wherein each electromagnet receives an input signal at a different time.

5. The device of claim 4, wherein the magnetic flux sensor is configured to detect the strength and the direction of the magnetic field generated by an electromagnet when the electromagnet receives the input signal.

6. The device of claim 5, wherein the position analyzer is further configured to: determine spatial vectors representing a position of the electromagnet magnet relative to the magnetic field sensor based on the output signal from the magnetic flux sensor from the strength and the direction of the magnetic field detected by the magnetic flux sensor when the electromagnet receives the input signal.

7. The device of claim 1, wherein each magnet receives an input signal having an attribute differing from another input signal received by another magnet.

8. The device of claim 1, wherein the device comprises a glove where the plurality of magnets are located at locations on the device corresponding to a plurality of fingers of the glove.

9. A method comprising:
    generating magnetic fields from a plurality of magnets each positioned at particular locations on a device, the particular locations being on different fingers of a user of the device and each configured to generate a magnetic field, the plurality of magnets comprising a plurality of electromagnets, each electromagnet receiving an input signal having a different frequency and generating the magnetic field in response to receiving the input signal;
    generating, by each of one or more inertial measurement units (IMUs), a signal for an angular orientation of a particular magnet of the plurality of magnets, the particular magnet located on a finger of the user;
    detecting, by a magnetic flux sensor located at a predetermined position relative to the device, a strength and a direction of the magnetic field generated by an electromagnet that received an input signal having a particular frequency, the magnetic flux sensor including a plurality of filters, with different filters centered on different frequencies of input signals received by different electromagnets so an output of a filter centered on the particular frequency identifies the strength and the direction of the magnetic field generated by the electromagnet;
    generating an output signal based on the strength and the direction of the magnetic field detected by the magnetic flux sensor; and
    determining a spatial vector representing a position of the magnet for which the strength and the direction of the magnetic field was detected relative to the magnetic flux sensor based on the generated output signal, and further based on the signal generated by an IMU of the one or more IMUs.

10. The method of claim 9, wherein generating the output signal based on the strength and the direction of the magnetic field detected by the magnetic flux sensor comprises:
  generating an output signal corresponding to the particular frequency from the strength and the direction of the magnetic field having the particular frequency.

11. The method of claim 10, wherein determining the spatial vector representing the position of the magnet for which the strength and the direction of the magnetic field was detected relative to the magnetic flux sensor based on the generated output signal comprises:
  determining a spatial vector representing a position of the electromagnet receiving an input signal having the particular frequency based on the generated output signal corresponding to the particular frequency from the strength and the direction of the magnetic field having the particular frequency.

* * * * *